United States Patent
Raghavan

(10) Patent No.: US 7,524,259 B2
(45) Date of Patent: Apr. 28, 2009

(54) WIDE RATIO TRANSMISSION WITH FOUR PLANETARY GEAR SETS AND FOUR BRAKES

(75) Inventor: Madhusudan Raghavan, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 172 days.

(21) Appl. No.: 11/744,463

(22) Filed: May 4, 2007

(65) Prior Publication Data

US 2008/0274853 A1    Nov. 6, 2008

(51) Int. Cl.
*F16H 3/44* (2006.01)
(52) U.S. Cl. ........................... 475/286; 475/290
(58) Field of Classification Search .......... 475/275–292
See application file for complete search history.

(56) References Cited

U.S. PATENT DOCUMENTS

| | | | |
|---|---|---|---|
| 5,885,184 A | * | 3/1999 | Park ........................... 475/286 |
| 6,375,592 B1 | | 4/2002 | Takahashi et al. |
| 6,425,841 B1 | | 7/2002 | Haka |
| 6,471,615 B1 | | 10/2002 | Naraki et al. |
| 6,558,287 B2 | | 5/2003 | Hayabuchi et al. |
| 7,128,683 B2 | * | 10/2006 | Oguri et al. .................. 475/276 |
| 2008/0015080 A1 | * | 1/2008 | Kamm et al. ................ 475/275 |
| 2008/0103015 A1 | * | 5/2008 | Seo ............................. 475/280 |
| 2008/0234093 A1 | * | 9/2008 | Diosi et al. .................. 475/276 |
| 2008/0261764 A1 | * | 10/2008 | Hart et al. ................... 475/276 |

* cited by examiner

*Primary Examiner*—Roger Pang

(57) ABSTRACT

The transmission has a plurality of members that can be utilized in powertrains to provide at least eight forward speed ratios and one reverse speed ratio. The transmission includes four planetary gear sets having seven torque-transmitting mechanisms and three fixed interconnections. The powertrain includes an engine and torque converter that is continuously connected to at least one of the planetary gear members and an output member that is continuously connected with another one of the planetary gear members. The seven torque-transmitting mechanisms provide interconnections between various gear members and with the transmission housing, and are operated in combinations of two to establish at least eight forward speed ratios and at least one reverse speed ratio.

10 Claims, 1 Drawing Sheet

| | Ratios | 85 | 86 | 87 | 88 | 80 | 82 | 84 |
|---|---|---|---|---|---|---|---|---|
| Reverse | -3 | X | | | | | | X |
| Neutral | 0 | X | | | | | | |
| 1 | 5.1 | X | | X | | | | |
| 2 | 3.1 | X | | | X | | | |
| 3 | 2.66 | X | | | | | X | |
| 4 | 1.87 | | | X | | | X | |
| 5 | 1.42 | | X | | | | X | |
| 6 | 1 | | | | | X | X | |
| 7 | 0.75 | | X | | | X | | |
| 8 | 0.65 | | | X | | X | | |

(X = engaged clutch)

Sample Design: $\dfrac{N_{R_1}}{N_{S_1}} = 3.00$, $\dfrac{N_{R_2}}{N_{S_2}} = 2.95$, $\dfrac{N_{R_3}}{N_{S_3}} = 1.70$, $\dfrac{N_{R_4}}{N_{S_4}} = 3.0$, $N_{p(max)} = 3.82$

| Ratio Spread | 7.8 |
|---|---|
| Ratio Steps | |
| Rev/1 | -0.59 |
| 1/2 | 1.65 |
| 2/3 | 1.17 |
| 3/4 | 1.42 |
| 4/5 | 1.32 |
| 5/6 | 1.42 |
| 6/7 | 1.33 |
| 7/8 | 1.15 |

WIDE RATIO TRANSMISSION WITH FOUR PLANETARY GEAR SETS AND FOUR BRAKES

TECHNICAL FIELD

The present invention relates to a family of power transmissions having four planetary gear sets that are controlled by seven torque-transmitting devices to provide at least eight forward speed ratios and at least one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

It is an object of the present invention to provide an improved family of transmissions having four planetary gear sets controlled to provide at least eight forward speed ratios and one reverse speed ratio.

The electrically variable transmission family of the present invention has four planetary gear sets, each of which includes a first, second and third member, which members may comprise a sun gear, a ring gear, or a planet carrier assembly member, in any order.

In referring to the first, second, third and fourth gear sets in this description and in the claims, these sets may be counted "first" to "fourth" in any order in the drawings (i.e., left to right, right to left, etc.). Additionally, the first, second or third members of each gear set may be counted "first" to "third" in any order in the drawings (i.e., top to bottom, bottom to top, etc.) for each gear set.

Each carrier member can be either a single-pinion carrier member (simple) or a double-pinion carrier member (compound). Embodiments with long pinions are also possible.

A first interconnecting member continuously connects the first member of the first planetary gear set with the first member of the second planetary gear set.

A second interconnecting member continuously connects the second member of the first planetary gear set with the first member of the third planetary gear set and the first member of the fourth planetary gear set.

A third interconnecting member continuously connects the second member of the second planetary gear set with the second member of the third planetary gear set and the second member of the fourth planetary gear set.

The input member is continuously connected with at least one member of the planetary gear sets. The output member is continuously connected with at least one member of the planetary gear sets.

A first torque transmitting device, such a clutch, selectively connects the first interconnecting member with a member of the first, second or third planetary gear set which is continuously connected with the input member.

A second torque transmitting device, such as a clutch, selectively connects a member of the second planetary gear set with a member of the first, second, third or fourth planetary gear set which is continuously connected with the input member.

A third torque transmitting device, such as a clutch, selectively connects the third interconnecting member with a member of the first, second, third or fourth planetary gear set which is continuously connected with the input member.

A fourth torque transmitting device, such as a brake, selectively connects the first interconnecting member with a stationary member (transmission housing/casing).

A fifth torque transmitting device, such as a brake, selectively connects the second interconnecting member with a stationary member (transmission housing/casing).

A sixth torque transmitting device, such as a brake, selectively connects the third interconnecting member with a stationary member (transmission housing/casing).

A seventh torque transmitting device, such as a brake, selectively connects a member of the fourth planetary gear set with a stationary member (transmission housing/casing).

The seven torque-transmitting mechanisms are selectively engageable in combinations of two to yield at least eight forward speed ratios and at least one reverse speed ratio.

A variety of speed ratios and ratio spreads can be realized by suitably selecting the tooth ratios of the planetary gear sets.

The above features and other features and advantages of the present invention are readily apparent from the following detailed description of the best modes for carrying out the invention when taken in connection with the accompanying drawings.

BRIEF DESCRIPTION OF THE DRAWING

FIG. 1a is a schematic representation of a powertrain including a planetary transmission in accordance with the present invention; and FIG. 1b is a truth table and chart depicting some of the operating characteristics of the powertrain shown in FIG. 1a.

DESCRIPTION OF THE PREFERRED EMBODIMENT

Figures 1A, 1B:
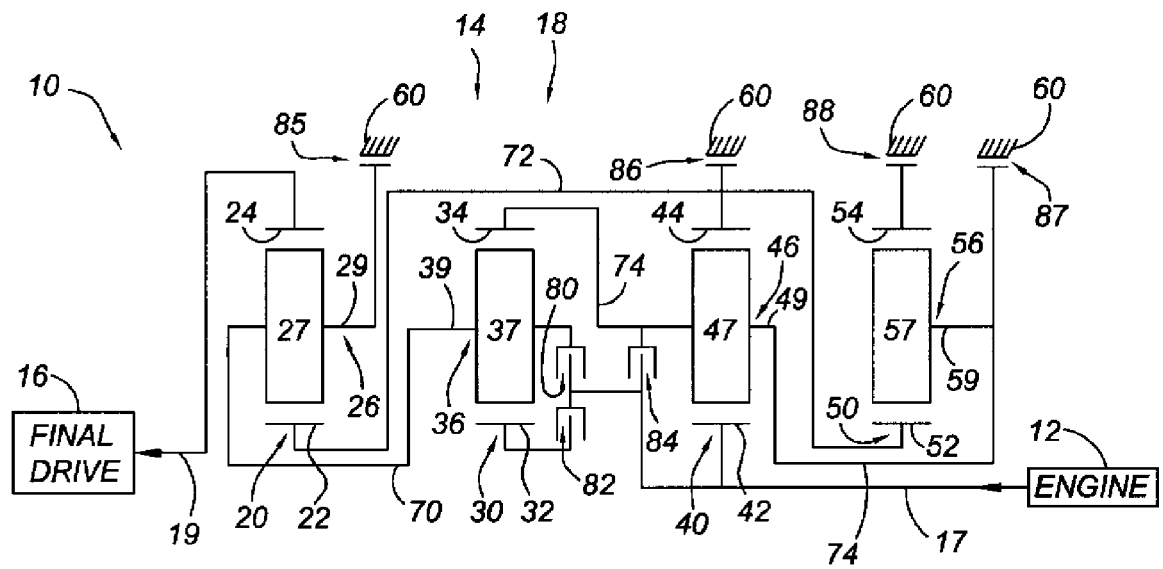

Referring to the drawings, there is shown in FIG. 1a a powertrain 10 having a conventional engine and torque converter 12, a planetary transmission 14, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 14 includes an input member 17 continuously connected with the engine 12, a planetary gear arrangement 18, and an output member 19 continuously connected with the final drive mechanism 16. The planetary gear arrangement 18 includes four planetary gear sets 20, 30, 40 and 50.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the ring gear member 34 and the sun gear member 32.

The planetary gear set 40 includes a sun gear member 42, a ring gear member 44, and a planet carrier assembly member 46. The planet carrier assembly member 46 includes a plurality of pinion gears 47 mounted on a carrier member 49 and disposed in meshing relationship with both the ring gear member 44 and the sun gear member 42.

The planetary gear set 50 includes a sun gear member 52, a ring gear member 54, and a planet carrier assembly member 56. The planet carrier assembly member 56 includes a plurality of pinion gears 57 mounted on a carrier member 59 and disposed in meshing relationship with both the ring gear member 54 and the sun gear member 52.

The planetary gear arrangement also includes seven torque-transmitting mechanisms 80, 82, 84, 85, 86, 87 and 88. The torque-transmitting mechanisms 80, 82 and 84 are rotating-type torque-transmitting mechanisms, commonly termed clutches. The torque-transmitting mechanisms 85, 86, 87 and 88 are stationary-type torque-transmitting mechanisms, commonly termed brakes or reaction clutches.

The input member 17 is continuously connected to the sun gear member 42 of the planetary gear set 40. The output member 19 is continuously connected with the ring gear member 24 of the planetary gear set 20. The first interconnecting member 70 continuously connects the carrier member 26 of the planetary gear set 20 with the carrier member 36 of the planetary gear set 30. A second interconnecting member 72 continuously connects the sun gear member 22 of the planetary gear set 20 with the ring gear member 44 of the planetary gear set 40 and with the sun gear member 52 of the planetary gear set 50. A third interconnecting member 74 continuously connects the ring gear member 34 of the planetary gear set 30 with the carrier member 46 of the planetary gear set 40 and with the carrier member 56 of the planetary gear set 50, A first torque transmitting device, such as clutch 80, selectively connects the carrier member 26 of the planetary gear set 20 and the carrier member 36 of the planetary gear set 30 via interconnecting member 70 with the sun gear member 42 of the planetary gear set 40 which is continuously connected with the input member 17. A second torque transmitting device, such as clutch 82, selectively connects the sun gear member 32 of the planetary gear set 30 with the sun gear member 42 of the planetary gear set 40 which is continuously connected with the input member 17. A third torque transmitting device, such as clutch 84, selectively connects the ring gear member 34 of the planetary gear set 30, the carrier member 46 of the planetary gear set 40 and the carrier member 56 of the planetary gear set 50 via the interconnecting member 74 with the sun gear member 42 of the planetary gear set 40 which is continuously connected with the input member 17. A fourth torque transmitting device, such as brake 85, selectively connects carrier member 26 of the planetary gear set 20 and the carrier member 36 of the planetary gear set 30 via the interconnecting member 70 with the transmission housing 60. A fifth torque transmitting device, such as brake 86, selectively connects the sun gear member 22 of the planetary gear set 20, the ring gear member 44 of the planetary gear set 40 and the sun gear member 52 of the planetary gear set 50 via the interconnecting member 72 with the transmission housing 60. A sixth torque transmitting device, such as brake 87, selectively connects the ring gear member 34 of the planetary gear set 30, the carrier member 46 of the planetary gear set 40 and the carrier member 56 of the planetary gear set 50 via the interconnecting member 74 with the transmission housing 60. A seventh torque transmitting device, such as brake 88, selectively connects the ring gear member 54 of the planetary gear set 50 with the transmission housing 60.

As shown in FIG. 1b, and in particular the truth table disclosed therein, the torque-transmitting mechanisms are selectively engaged in combinations of two to provide at least eight forward speed ratios and one reverse speed ratio.

The reverse (Reverse) speed ratio is established with the engagement of the clutch 84 and the brake 85. The clutch 84 engages the ring gear member 34, the carrier member 46 and the carrier member 56 via the interconnecting member 74 with the sun gear member 42 which is continuously connected with the input member 17. The brake 85 engages the carrier member 26 and the carrier member 36 via the interconnecting member 70 with the transmission housing 60. The sun gear member 22, ring gear member 34, planetary gear sets 40 and 50 rotate at the same speed as the input member 17. As is understood by those skilled in the art, whenever two members of a planetary gear set rotate at the same speed, the entire planetary gear set rotates at the same speed. The carrier member 26 and carrier member 36 do not rotate. The ring gear member 24 and output member 19 rotate at the same speed. The speed of the ring gear member 24, and therefore the output member 19, is determined from the speed of the sun gear member 22 and the ring gear/sun gear tooth ratio of the planetary gear set 20. The numerical value of the reverse speed ratio is determined utilizing the ring gear/sun gear tooth ratios of the planetary gear set 20.

The first forward speed ratio is established with the engagement of the brakes 85 and 87. The brake 85 engages the carrier member 26 and carrier member 36 via the interconnecting member 70 with the transmission housing 60. The brake 87 engages the ring gear member 34, the carrier member 46 and the carrier member 56 via the interconnecting member 74 with the transmission housing 60. The sun gear member 42 rotates at the same speed as the input member 17. The ring gear member 34, carrier member 46 and carrier member 56 do not rotate. The sun gear member 22, ring gear member 44 and sun gear member 52 rotate at the same speed. The speed of the ring gear member 44 is determined from the speed of the sun gear member 42 and the ring gear/sun gear tooth ratio of the planetary gear set 40. The carrier member 26 and carrier member 36 do not rotate. The ring gear member 24 and output member 19 rotate at the same speed. The speed of the ring gear member 24, and therefore the output member 19, is determined from the speed of the sun gear member 22 and the ring gear/sun gear tooth ratio of the planetary gear set 20. The numerical value of the first forward speed ratio is determined utilizing the ring gear/sun gear tooth ratios of the planetary gear sets 20 and 40.

The second forward speed ratio is established with the engagement of the brakes 85 and 88. The brake 85 engages the carrier member 26 and carrier member 36 via the interconnecting member 70 with the transmission housing 60. The brake 88 engages the ring gear member 54 with the transmission housing 60. The sun gear member 42 rotates at the same speed as the input member 17. The ring gear member 34, carrier member 46 and carrier member 56 rotate at the same speed. The sun gear member 22, ring gear member 44 and sun gear member 52 rotate at the same speed. The speed of the carrier member 46 is determined from the speed of the sun gear member 42, the speed of the ring gear member 44 and the ring gear/sun gear tooth ratio of the planetary gear set 40. The ring gear member 54 does not rotate. The speed of the sun gear member 52 is determined from the speed of the carrier member 56 and the ring gear/sun gear tooth ratio of the planetary gear set 50. The carrier member 26 and carrier member 36 do not rotate. The ring gear member 24 and output member 19 rotate at the same speed. The speed of the ring gear member 24, and therefore the output member 19, is determined from the speed of the sun gear member 22 and the ring gear/sun gear tooth ratio of the planetary gear set 20. The numerical value of the second forward speed ratio is determined utilizing the ring gear/sun gear tooth ratios of the planetary gear sets 20, 40 and 50.

The third forward speed ratio is established with the engagement of the clutch 82 and brake 85. The clutch 82 engages the sun gear member 32 with the sun gear member 42 which is continuously connected with the input member 17. The brake 85 engages the carrier member 26 and carrier member 36 via the interconnecting member 70 with the transmission housing 60. The sun gear member 32 and sun gear member 42 rotate at the same speed as the input member 17. The ring gear member 34, carrier member 46 and carrier member 56 rotate at the same speed. The sun gear member 22, ring gear member 44 and sun gear member 52 rotate at the same speed. The speed of the ring gear member 44 is determined from the speed of the sun gear member 42, the speed of the carrier member 46 and the ring gear/sun gear tooth ratio of the planetary gear set 40. The carrier member 26 and carrier member 36 do not rotate. The speed of the ring gear member 34 is determined from the speed of the sun gear member 32 and the ring gear/sun gear tooth ratio of the planetary gear set 30. The ring gear member 24 and output member 19 rotate at the same speed. The speed of the ring gear member 24, and therefore the output member 19, is determined from the speed of the sun gear member 22 and the ring gear/sun gear tooth ratio of the planetary gear set 20. The numerical value of the third forward speed ratio is determined utilizing the ring gear/sun gear tooth ratios of the planetary gear sets 20, 30 and 40.

The fourth forward speed ratio is established with the engagement of the clutch 82 and the brake 87. The clutch 82 engages the sun gear member 32 with the sun gear member 42 which is continuously connected with the input member 17. The brake 87 engages the ring gear member 34, carrier member 46 and carrier member 56 via the interconnecting member 74 with the transmission housing 60. The sun gear member 32 and sun gear member 42 rotate at the same speed as the input member 17. The ring gear member 34, carrier member 46 and carrier member 56 do not rotate. The sun gear member 22, ring gear member 44 and sun gear member 52 rotate at the same speed. The speed of the ring gear member 44 is determined from the speed of the sun gear member 42, the speed of the carrier member 46 and the ring gear/sun gear tooth ratio of the planetary gear set 40. The carrier member 26 and carrier member 36 rotate at the same speed. The speed of the carrier member 36 is determined from the speed of the sun gear member 32 and the ring gear/sun gear tooth ratio of the planetary gear set 30. The ring gear member 24 and output member 19 rotate at the same speed. The speed of the ring gear member 24, and therefore the output member 19, is determined from the speed of the sun gear member 22, the speed of the carrier member 26 and the ring gear/sun gear tooth ratio of the planetary gear set 20. The numerical value of the fourth forward speed ratio is determined utilizing the ring gear/sun gear tooth ratios of the planetary gear sets 20, 30 and 40.

The fifth forward speed ratio is established with the engagement of the clutch 82 and the brake 86. The clutch 82 engages the sun gear member 32 with the sun gear member 42 which is continuously connected with the input member 17. The brake 86 engages the sun gear member 22, the ring gear member 44 and sun gear member 52 via interconnecting member 72 with the transmission housing 60. The sun gear member 32 and sun gear member 42 rotate at the same speed as the input member 17. The sun gear member 22, ring gear member 44 and sun gear member 52 do not rotate. The ring gear member 34, carrier member 46 and carrier member 56 rotate at the same speed. The speed of carrier member 46 is determined from the speed of the sun gear member 42 and the ring gear/sun gear tooth ratio of the planetary gear set 40. The carrier member 26 and carrier member 36 rotate at the same speed. The speed of the carrier member 36 is determined from the speed of the ring gear member 34, the speed of the sun gear member 32 and the ring gear/sun gear tooth ratio of the planetary gear set 30. The ring gear member 24 and output member 19 rotate at the same speed. The speed of the ring gear member 24, and therefore the output member 19, is determined from the speed of the carrier member 26 and the ring gear/sun gear tooth ratio of the planetary gear set 20. The numerical value of the fifth forward speed ratio is determined utilizing the ring gear/sun gear tooth ratios of the planetary gear sets 20, 30 and 40.

The sixth forward speed ratio is established with the engagement of the clutches 80 and 82. In this configuration, the input member 17 is directly connected with the output member 19. The numerical value of the ninth forward speed ratio is 1.

The seventh forward speed ratio is established with the engagement of the clutch 80 and the brake 86. The clutch 80 engages the carrier member 26 and the carrier member 36 via interconnecting member 70 with the sun gear member 42 which is continuously connected with the input member 17. The brake 86 engages the sun gear member 22, the ring gear member 44 and sun gear member 52 via interconnecting member 72 with the transmission housing 60. The carrier member 26, carrier member 36 and sun gear member 42 rotate at the same speed as the input member 17. The sun gear member 22, ring gear member 44 and sun gear member 52 do not rotate. The ring gear member 34, carrier member 46 and carrier member 56 rotate at the same speed. The speed of the carrier member 46 is determined from the speed of the sun gear member 42 and the ring gear/sun gear tooth ratio of the planetary gear set 40. The ring gear member 24 and output member 19 rotate at the same speed. The speed of the ring gear member 24, and therefore the output member 19, is determined from the speed of the carrier member 26 and the ring gear/sun gear tooth ratio of the planetary gear set 20. The numerical value of the seventh forward speed ratio is determined utilizing the ring gear/sun gear tooth ratios of the planetary gear sets 20 and 40.

The eighth forward speed ratio is established with the engagement of the clutch 80 and the brake 87. The clutch 80 engages the carrier member 26 and carrier member 36 via interconnecting member 70 with the sun gear member 42 which is continuously connected with the input member 17. The brake 87 engages the ring gear member 34, carrier member 46 and carrier member 56 via interconnecting member 74 with the transmission housing 60. The carrier member 26, carrier member 36 and sun gear member 42 rotate at the same speed as the input member 17. The ring gear member 34, carrier member 46 and carrier member 56 do not rotate. The sun gear member 22, ring gear member 44 and sun gear member 52 rotate at the same speed. The speed of the ring gear member 44 is determined from the speed of the sun gear member 42 and the ring gear/sun gear tooth ratio of the planetary gear set 40. The ring gear member 24 and output member 19 rotate at the same speed. The speed of the ring gear member 24, and therefore the output member 19, is determined from the speed of the carrier member 26 and the ring gear/sun gear tooth ratio of the planetary gear set 20. The numerical value of the eighth forward speed ratio is determined utilizing the ring gear/sun gear tooth ratios of the planetary gear sets 20 and 40.

As set forth above, the engagement schedule for the torque-transmitting mechanisms is shown in the truth table of FIG. 1b. This truth table also provides an example of speed ratios that are available utilizing the ring gear/sun gear tooth ratios given by way of example in FIG. 1b. The $N_{R1}/S_{R1}$ value is the tooth ratio of the planetary gear set 20; the $N_{R2}/S_{R2}$ value is the tooth ratio of the planetary gear set 30; the $N_{R3}/S_{R3}$ value is the tooth ratio of the planetary gear set 40; and the $N_{R4}/S_{R4}$ value is the tooth ratio of the planetary gear set 50. Also, the chart of FIG. 1b describes the ratio steps that are attained utilizing the sample of tooth ratios given for the engagement schedules of the above described transmission. For example, the step ratio between the first and second forward speed ratios is 1.65, while the step ratio between the reverse speed ratio (Reverse) and first forward ratio is −0.59.

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input shaft;
an output shaft;
first, second, third and fourth planetary gear sets each having first, second and third members;
said input shaft being continuously interconnected with at least one member of said planetary gear sets, and said output shaft being continuously interconnected with another member of said planetary gear sets;
a first interconnecting member continuously connecting said first member of said first planetary gear set with said first member of said second planetary gear set;
a second interconnecting member continuously connecting said second member of said first planetary gear set with said first member of said third planetary gear set and said first member of said fourth planetary gear set;
a third interconnecting member continuously connecting said second member of said second planetary gear set with said second member of said third planetary gear set and said second member of said fourth planetary gear set;
a first torque-transmitting mechanism selectively connecting said first interconnecting member with a member of said first, second, third or fourth planetary gear set which is continuously connected with said input member;
a second torque-transmitting mechanism selectively connecting a member of said second planetary gear set with a member of said first, second, third or fourth planetary gear set which is continuously connected with said input member;
a third torque-transmitting mechanism selectively connecting said third interconnecting member with a member of said first, second, third or fourth planetary gear set which is continuously connected with said input member;
a fourth torque-transmitting mechanism selectively connecting said first interconnecting member with a stationary member;
a fifth torque-transmitting mechanism selectively connecting said second interconnecting member with said stationary member;
a sixth torque-transmitting mechanism selectively connecting said third interconnecting member with said stationary member;
a seventh torque-transmitting mechanism selectively connecting a member of said fourth planetary gear set with said stationary member;
said torque-transmitting mechanisms being engaged in combinations of two to establish at least eight forward speed ratios and at least one reverse speed ratio between said input shaft and said output shaft.

2. The transmission defined in claim 1, wherein said first, second and third torque-transmitting mechanisms comprise clutches, and said fourth fifth, sixth and seventh torque-transmitting mechanisms comprise brakes.

3. A multi-speed transmission comprising:
an input shaft;
an output shaft;
a planetary gear arrangement having first, second, third and fourth planetary gear sets, each planetary gear set having first, second and third members;
said input shaft being continuously interconnected with at least one member of said planetary gear sets, and said output shaft being continuously interconnected with another member of said planetary gear sets;

a first interconnecting member continuously connecting said first member of said first planetary gear set with said first member of said second planetary gear set;

a second interconnecting member continuously connecting said second member of said first planetary gear set with said first member of said third planetary gear set and with said first member of said fourth planetary gear set;

a third interconnecting member continuously connecting said second member of said second planetary gear set with said second member of said third planetary gear set and said second member of said fourth planetary gear set; and seven torque-transmitting mechanisms for selectively interconnecting said members of said planetary gear sets with a stationary member or with other members of said planetary gear sets, said seven torque-transmitting mechanisms being engaged in combinations of two to establish at least eight forward speed ratios and at least one reverse speed ratio between said input shaft and said output shaft.

4. The transmission defined in claim 3, wherein a first of said seven torque-transmitting mechanisms is operable for selectively connecting said first interconnecting member with a member of said first, second, third or fourth planetary gear set which is continuously connected with said input member.

5. The transmission defined in claim 4, wherein a second of said seven torque-transmitting mechanisms is operable for selectively connecting a member of said second planetary gear set with a member of said first, second, third or fourth planetary gear set which is continuously connected with said input member.

6. The transmission defined in claim 5, wherein a third of said seven torque-transmitting mechanisms is operable for selectively connecting said third interconnecting member with a member of said first, second, third or fourth planetary gear set which is continuously connected with said input member.

7. The transmission defined in claim 6, wherein a fourth of said seven torque-transmitting mechanisms is operable for selectively connecting said first interconnecting member with a stationary member.

8. The transmission defined in claim 7, wherein a fifth of said seven torque-transmitting mechanisms is operable for selectively connecting said second interconnecting member with said stationary member.

9. The transmission defined in claim 8, wherein a sixth of said seven torque-transmitting mechanisms is operable for selectively connecting said third interconnecting member with said stationary member.

10. The transmission defined in claim 9, wherein a seventh of said seven torque-transmitting mechanisms is operable for selectively interconnecting a member of said fourth planetary gear set with said stationary member.

* * * * *